Oct. 15, 1929.    P. O. NOBLE    1,731,934
ELECTRIC WELDING APPARATUS
Original Filed Sept. 19. 1918    2 Sheets-Sheet 1

Inventor:
Paul O. Noble,
by Albert G. Davis
His Attorney.

Oct. 15, 1929.   P. O. NOBLE   1,731,934
ELECTRIC WELDING APPARATUS
Original Filed Sept. 19, 1918   2 Sheets-Sheet 2

Inventor:
Paul O. Noble,
by Albert G. Davis
His Attorney.

Patented Oct. 15, 1929.

1,731,934

UNITED STATES PATENT OFFICE

PAUL O. NOBLE, OF SCHENECTADY, NEW YORK, ASSIGNOR TO GENERAL ELECTRIC COMPANY, A CORPORATION OF NEW YORK

ELECTRIC WELDING APPARATUS

Continuation of application Serial No. 254,710, filed September 19, 1918. This application filed September 11, 1919, Serial No. 323,171. Renewed March 18, 1929.

My invention relates to electric arc welding and is particularly adapted for the continuous feed of an electrode which is rapidly consumed during the welding operation. The object of my invention is to provide an improved device for automatically maintaining a welding arc of predetermined length notwithstanding variations in the rate of consumption of the electrode or irregularities in the surface of the work. In accordance with my invention, a welding electrode is fed continuously to the welding arc the rate of feed being regulated to maintain the arc at substantially constant length. The electrode is arranged to be fed by an electric motor the speed of which is controlled in accordance with an electrical characteristic of the welding energy, for example, in accordance with the voltage across the terminals of the welding arc. In accordance with my invention auxiliary regulating means are provided to assist in maintaining the welding arc at constant length and to cooperate in starting the arc.

This application is a continuation of my application Serial No. 254,710 filed September 19, 1918, as to common features of the automatic control of the electrode feed. This control is claimed generically in my co-pending application Serial No. 323,170, filed Sept. 11, 1919, together with another species of my control means.

Figure 1:
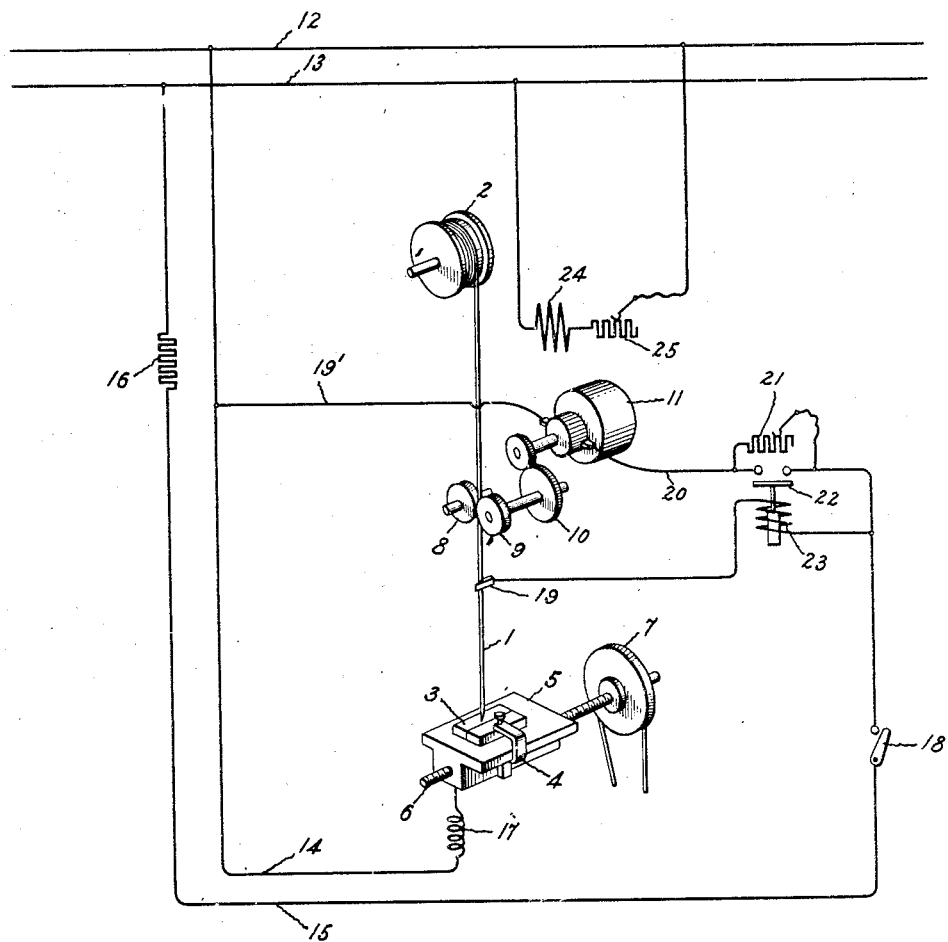
Figure 2:
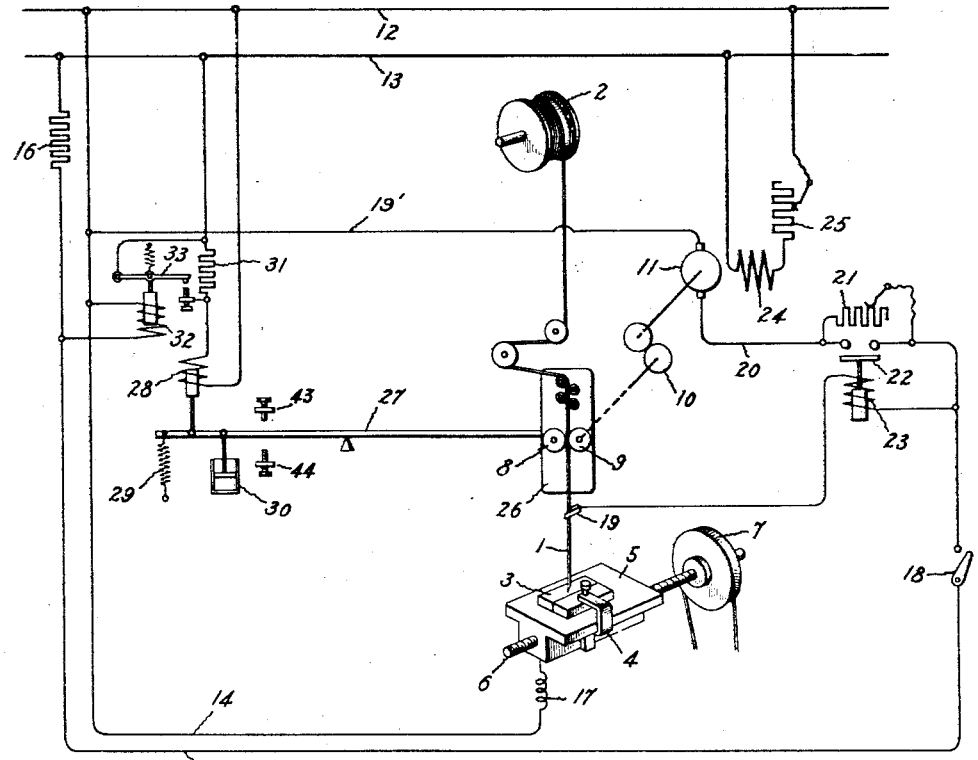
Figure 3:
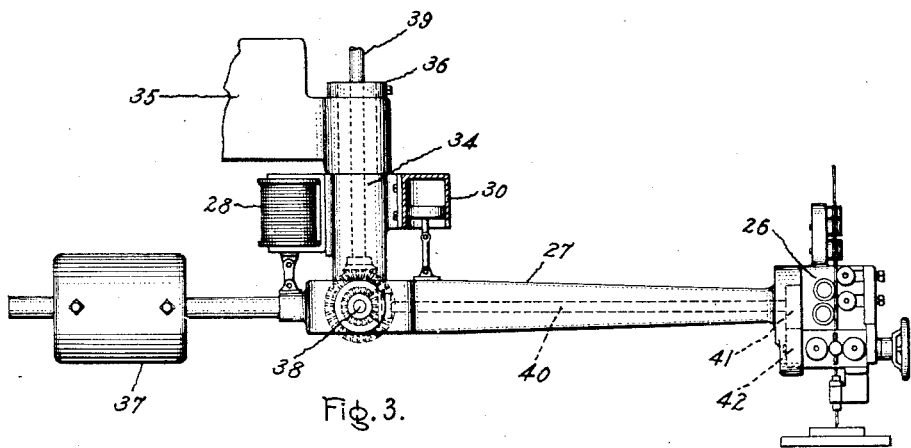

In the accompanying drawing, Fig. 1 illustrates diagrammatically an arrangement particularly adapted for feeding a consuming electrode such as a metal wire to an arc playing between the wire and the work. Fig. 2 diagrammatically illustrates an embodiment of my present invention in which means are provided for controlling the position of the welding head through which the welding electrode is automatically fed. Fig. 3 illustrates a part of the welding machine and shows a practical embodiment of the movable welding head arrangement of Fig. 2.

Referring to Fig. 1 of the drawing, the welding electrode 1 comprises for example a wire or rod of iron or steel fed from a reel 2 to the welding arc playing between wire 1 and the work 3, which may consist, for example, of two plates to be welded together along their edges. The work is suitably held, for example, by means of one or more clamps 4 (one only being shown) upon a table 5. The table 5 is traversed in the direction of the seam to be welded in any suitable manner, for example, by the rotation of a threaded shaft 6, which may be driven by pulley and belt 7 or in any other suitable manner. The electrode 1 is moved forward as it melts at a rate adapted to maintain the welding arc at substantially constant length. The means indicated for moving the wire constituting the welding electrode comprises two guiding and feeding rollers 8 and 9 driven through a suitable reducing gear 10 by an electric motor 11.

The welding current is derived from constant potential mains 12 and 13 to which the welding circuit 14 and 15 is connected through a current regulating means shown as a resistor 16 which acts in a well known manner to reduce the voltage of the welding circuit as the welding current increases. One side 14, of the welding circuit is connected to the work, preferably through a reactance device 17 which acts to smooth out fluctuations in the welding current. The other side 15 of the welding circuit is connected through a switch 18 to the brush 19 which represents any type of means for feeding current to the moving electrode 1.

Various regulators may be employed in place of the resistor 16 as far as the combination in this case is concerned. One such regulating means is shown in my Patent 1,310,131 granted July 15, 1919. The armature of the electrode-feed motor 11 is connected by conductors 19' and 20 to the welding circuit 14, 15. A protective device comprising a resistor 21 which is preferably made adjustable is connected in circuit with the motor armature for a purpose hereinafter set forth. The resistor is arranged to be short-circuited by a switch 22 controlled by a winding 23 connected in the welding circuit. This protective arrangement is claimed in my application, Serial No. 323,170, above referred to. The motor 11 is provided with a field winding 24 connected across the constant potential mains 12 and 13 in series with a variable resistance 25 which may be adjusted for the desired field strength.

The operation of the invention shown in Fig. 1 will now be described. The electrode 1 is preferably first provided with a readily vaporizable tip. This may be done for example by sharpening the end of the electrode by means of cutting pliers as described and claimed in my co-pending application Serial No. 323,170 referred to. Switch 18 is then closed completing the circuit of the armature of the motor 11 through resistor 21 and the motor begins to rotate and slowly feed the electrode 1 towards the work. As soon as the tip of the electrode engages the work the welding circuit is completed from main 13 through resistor 16, wire 15, switch 18, winding 23, brush 19, electrode 1, the work reactance device 17, and lead 14 to the main 12. The tip of the electrode is at once vaporized and the arc struck. The welding current will at once energize winding 23 to close switch 22 and short-circuit the resistor 21. The motor armature 11 is thus connected directly across the welding circuit 14, 15 and the motor field being constantly excited the motor speed will vary in accordance with the voltage across the arc.

When the arc has been struck the regulating means 16 acts to reduce the voltage of the welding current from for example about 60 volts to about 12 volts and this low voltage is automatically varied inversely to variations in the welding current in a suitable manner to give the electrical characteristics desired for arc welding circuits. Any variation in the length of the arc therefore produces a variation in the voltage across motor armature 11 which in turn varies the speed thereby controlling the rate at which the electrode is fed to the weld so that the welding arc is kept at substantially constant length. As the weld progresses the work is fed forward by the screw 6 at the proper rate to enable the seam or joint to be properly welded.

Where, as in this case, the feed motor is so connected as inherently to vary in speed in accordance with the voltage across the arc the motor must be designed to be sensitive to small variations in voltage since the normal welding voltage is in the neighborhood of 12 to 18 volts. Inasmuch as the voltage of the welding circuit when the flow of the welding current is interrupted rises to several times this voltage the resistor 21 must be arranged to be in circuit whenever the flow of welding current ceases since otherwise the excessive voltage would cause the motor to feed the electrode forward at such a high rate that it would be practically impossible to start the arc. The winding 23 is therefore provided for the purpose of causing the resistor 21 to be placed in circuit whenever the welding current ceases to flow and for causing the resistor to be rendered inoperative upon the resumption of the flow of welding current.

It will be observed that the feed motor as designed and connected provides an arrangement in which the rate at which the electrode is fed is automatically controlled by the inherent regulation of the motor as distinguished from control by external regulation. While the motor has been shown as separately excited and such arrangement secures a marked variation in speed with slight variations in voltage, nevertheless, it is obvious to those skilled in the art that there are other ways of connecting the motor so as to obtain more or less satisfactory inherent speed regulation without departing from the spirit of my invention.

In the embodiment of my invention disclosed in Fig. 2, the welding head 26 which carries the feed rollers 8 and 9 is mounted upon a pivoted arm 27 so that the distance of the welding head from the work may be automatically controlled. The position of the welding head is controlled by the solenoid 28 which acts in opposition to a spring or equivalent means 29, a dash-pot 30 being provided to steady the movements of the arm. The solenoid 28 is connected to the mains 12 and 13, and in series with the solenoid a resistor 31 is provided which is arranged to be thrown into and out of circuit by means of a vibratory device comprising a winding 32 connected across the welding circuit 14, 15 and a pivoted contact arm 33 controlled thereby. Adjustable stops 43 and 44 provided to limit the movement of the pivoted arm 27 which carries the welding head 26.

The operation of the arrangement shown in Fig. 2 is similar to that of Fig. 1 as far as the automatic control of the rate of electrode feed by the motor 11 is concerned. Inasmuch, however, as the welding head is movable it is necessary in this arrangement either to mount the driving motor upon the welding head or to connect the motor to the feed rollers through a power transmitting arrangement which will permit the head to move while the driving motor remains stationary. This flexible power transmission is indicated in Fig. 2 by the dotted line connecting the gear 10 to the rollers 9 and 8.

The operation of the automatic means for controlling the position of the electrode head is substantially as follows: The winding 32 being connected across the welding circuit 14, 15 is subject to the varying voltage appearing in the welding circuit and any tendency of the voltage of this circuit to rise causes the solenoid 32 to attract the pivoted arm 33 and short-circuit the resistor 31. This has the effect of strengthening winding 28 which will attract the core of the solenoid to move the welding head 26 closer to the work which in turn will lower the voltage at the arc to weaken the winding 32 to cause the resistor 31 to be re-inserted in circuit with the winding 28. In the normal operation of the device the arm 33 will vibrate rapidly, the strength of the solenoid 28 being determined by the relative duration of the periods of engagement and disengagement of the contacts controlling the shunt around resistor 31. The dash-pot 30 acts to so steady the arm 27 that normally it remains at approximately its mid position while the length of the arc is mainly regulated by the variable speed motor 11, as set forth in the description of the arrangement shown in Fig. 1. If, however, such irregularities in the surface of the work are encountered, that the regulation cannot be fully taken care of by the variation in speed of the feed motor, the solenoid 28 causes such a movement of the welding head 26 as will maintain the length of the arc substantially constant. Where the seam to be welded does not lie in a horizontal plane, as for example where there are abrupt humps in the work to be welded, it may happen that the arc will tend to shorten or lengthen more rapidly than the feed motor 11 is able to compensate for such irregularities by varying the rate of electrode feed. In such cases the automatic regulating means comprising the solenoid 28 will instantly move the welding head to compensate for the irregularities in the work.

The electromagnetic means shown in Fig. 2 for controlling the position of the welding head also cooperates in the combination to strike the welding arc in the following manner. When the welding circuit is broken the full voltage of the mains 12, 13 is impressed upon the winding 32. The resistor 31 is therefore short-circuited and maximum voltage applied to the solenoid 28 which moves the welding head to the limit of its movement toward the work as determined by the stop 43. As soon as the electrode is moved into contact with the work by the electrode feed motor 11 and the welding current begins to flow, the voltage across winding 32 is reduced and the pivoted member 33 operates to affect the circuit of the resistor 31 to weaken the solenoid 28, and the spring 29 at once raises the welding head to separate the electrode from the work to strike the arc.

Fig. 3 represents a practical embodiment of the automatically movable welding head arrangement, and in this figure the arm 27 is represented as movable about horizontal and vertical axes. The part 34 is pivoted for movement about a vertical axis extending through the support 35 on which the welding head is mounted. A collar 36 holds the part 34 against the support 35. The arm 27 is pivoted about the horizontal axis 38 so that the welding head is arranged for universal movement. The solenoid 28 and dash-pot 30 are carried by the part 34. The welding head 26 is slightly over balanced by the adjustable counterweight 37 to provide a force corresponding to that of the spring 29 in Fig. 2. If desired, a spring may be arranged between the part 34 and pivoted arm 27 in addition to the counterweight. Power is transmitted to the rollers of the welding head from shaft 39 through bevel pinions and gears to shaft 40 and from shaft 40 through gears 41 and 42 to the electrode feed rollers, the roller 9 of Fig. 2 being mounted on the shaft of gear 41. The welding head is not shown in detail for the reason that as far as the invention in this case is concerned the particular structure of the welding head is immaterial.

While I have shown and described certain connections for the inherent regulation of the feed motor and a particular arrangement for adjusting the position of the welding head, such modifications and variations of these connections and means are contemplated as fall within the scope of my invention which is set forth in the appended claims.

What I claim as new and desire to secure by Letters Patent of the United States, is:

1. Arc welding apparatus comprising a fusible electrode adapted to be continuously fed to maintain the welding arc, a motor arranged to feed said electrode at a rate depending upon the voltage at the arc and additional means for automatically controlling the length of the arc in accordance with the voltage at the arc.

2. An arc welding apparatus comprising a welding head, a member for movably supporting said head, means for damping movements of said member, a fusible electrode adapted to be continuously fed through said head to maintain the welding arc, a motor arranged to feed said electrode at a rate depending upon an electrical characteristic of the welding energy and means for automatically adjusting the position of the welding head relatively to the work, in accordance with irregularities in the surface to be welded.

3. An apparatus for electric arc welding comprising electrode feeding means, means for movably supporting said feeding means, means for operating said feeding means in accordance with en electrical characteristic of the arc which varies with the arc length to control the arc length and a vibratory regulator for adjusting the position of said feeding means upon its support responsive to an electrical characteristic of the arc which varies with the arc length to control the arc length.

4. An apparatus for electric arc welding comprising electrode feeding means, a pivoted arm for supporting said feeding means, an electroresponsive means for adjusting the position of said arm, means for damping movements of said arm, means responsive to the voltage of the arc for controlling the energization of said electroresponsive means, and means responsive to the voltage of the arc for controlling the operation of said electrode feeding means to control the arc length.

5. An apparatus for automatic electric arc welding comprising electrode feeding rolls, a movable member for supporting said rolls, spaced stops for limiting the movement of said member, electroresponsive means comprising a vibratory regulator responsive to an electrical characteristic of the arc which varies with the arc length for controlling movement of said member between said stops and means comprising an electric motor for operating said feed roll to feed the electrode.

In witness whereof, I have hereunto set my hand this 10th day of September, 1919.

PAUL O. NOBLE.